United States Patent
Ji et al.

(10) Patent No.: US 12,336,024 B2
(45) Date of Patent: Jun. 17, 2025

(54) METHODS AND APPARATUSES TO EXPLOIT SIMULTANEOUS MODE 1 AND MODE 2 FOR LOAD BALANCING AND MODE SWITCHING

(71) Applicant: NOKIA TECHNOLOGIES OY, Espoo (FI)

(72) Inventors: Lianghai Ji, Aalborg (DK); Ling Yu, Kauniainen (FI); Jedrzej Stanczak, Wroclaw (PL); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 322 days.

(21) Appl. No.: 17/773,303

(22) PCT Filed: Oct. 27, 2020

(86) PCT No.: PCT/EP2020/080152
§ 371 (c)(1),
(2) Date: Apr. 29, 2022

(87) PCT Pub. No.: WO2021/083876
PCT Pub. Date: May 6, 2021

(65) Prior Publication Data
US 2022/0394790 A1 Dec. 8, 2022

Related U.S. Application Data

(60) Provisional application No. 62/927,393, filed on Oct. 29, 2019.

(51) Int. Cl.
*H04W 76/14* (2018.01)
*H04W 72/02* (2009.01)
*H04W 72/23* (2023.01)

(52) U.S. Cl.
CPC .......... *H04W 76/14* (2018.02); *H04W 72/02* (2013.01); *H04W 72/23* (2023.01)

(58) Field of Classification Search
CPC ..... H04W 76/14; H04W 72/02; H04W 72/23; H04W 88/04; H04W 92/18; H04W 4/30; H04W 4/40; H04W 4/46
See application file for complete search history.

(56) References Cited

U.S. PATENT DOCUMENTS

2022/0007390 A1* 1/2022 Basu Mallick ........... H04L 1/08
2022/0061055 A1* 2/2022 Freda ................. H04W 72/1263
(Continued)

FOREIGN PATENT DOCUMENTS

KR 20210017915 A * 1/2021

OTHER PUBLICATIONS

International Search Report and Written Opinion dated Feb. 4, 2021 corresponding to International Patent Application No. PCT/EP2020/080152.
(Continued)

*Primary Examiner* — Sudesh M Patidar
(74) *Attorney, Agent, or Firm* — Barta Jones, PLLC

(57) ABSTRACT

Systems, methods, apparatuses, and computer program products for selecting and/or applying a sidelink (SL) transmission mode are provided. One method may include configuring, by a network node, at least one sidelink (SL) user equipment (UE) to use simultaneous sidelink (SL) mode 1 and mode 2 for one or more sidelink (SL) logical channels (LCHs). The method may also include configuring the at least one sidelink (SL) user equipment (UE) with a plurality of transmission patterns related to the use of the sidelink (SL) mode 1 or mode 2.

19 Claims, 4 Drawing Sheets

(56) References Cited

U.S. PATENT DOCUMENTS

| | | | |
|---|---|---|---|
| 2022/0159628 A1* | 5/2022 | Bangolae | H04W 72/04 |
| 2022/0174582 A1* | 6/2022 | Rao | H04W 76/14 |
| 2022/0217752 A1* | 7/2022 | Yang | H04W 72/12 |
| 2022/0394677 A1* | 12/2022 | Wu | H04W 72/02 |
| 2023/0018107 A1* | 1/2023 | Wang | H04W 72/02 |

OTHER PUBLICATIONS

Huawei et al., "Discussion about mode coexistence for NR sidelink," 3GPP Draft; R2-1913700, 3GPP TSG-RAN WG2 #107bis, Chongqing, China, Oct. 14-18, 2019, Oct. 4, 2019, XP051805165.

Vivo, "Discussion on support of simultaneous mode 1 and mode 2," 3GPP Draft; R2-1901118, 3GPP TSG-RAN WG2 Meeting #105, Athens, Greece, Feb. 25-Mar. 1, 2019, Feb. 15, 2019, XP051602480.

Huawei et al., "Simultaneous mode 1 and mode 2 operation for NR sidelink, " 3GPP Draft; R1-1905898, 3GPP TSG RAN WG1 Meeting #96bis, Xi'an, China, Apr. 8-12, 2019, Apr. 15, 2019, XP051707941.

Vivo, "Discussion on support of simultaneous mode 1 and mode 2," 3GPP Draft; R2-1910222, 3GPP TSG-RAN WG2 Meeting #107, Prague, Czech Republicat, Aug. 26-30, 2019, Aug. 16, 2019, XP051768003.

Huawei et al., "RAN2 impacts on simultaneous mode-1 and mode-2 configuration for NR SL communication," 3GPP Draft, R2-1909131, 3GPP TSG-RAN WG2 #107, Prague, Czech Republic, Aug. 26-30, 2019.

InterDigital Inc., "RAN2 Aspects of Simultaneous Configuration of Mode 1 and Mode 2," 3GPP Draft; R2-1909591, 3GPP RAN WG2 Meeting #107, Prague, Czech Republic, Aug. 26-30, 2019.

Ericsson, "Simultaneous configuration of mode-1 and mode-2," 3GPP Draft, R2-1910313, 3GPP TSG-RAN WG2 #107, Prague, Czech, Aug. 26-30, 2019.

Intel Corporation, "Simultaneous operation of mode1 and mode2 in NR V2X," 3GPP Draft, R2-1910382, 3GPP TSG-RAN WG2 Meeting #107, Prague, Czech Republic, Aug. 26-30, 2019.

Motorola Mobility et al., "Subtopics to be addressed in Sim M1M2," 3GPP Draft; R2-1910442, 3GPP TSG RAN WG2 Meeting 107, Prague, Czech Republic, Aug. 26-30, 2019.

Huawei et al., "Discussion about mode coexistence for NR sidelink," 3GPP Draft; R2-1911083, 3GPP TSG-RAN WG2 #107, Prague, Czech Republic, Aug. 26-30, 2019.

* cited by examiner

METHODS AND APPARATUSES TO EXPLOIT SIMULTANEOUS MODE 1 AND MODE 2 FOR LOAD BALANCING AND MODE SWITCHING

CROSS-REFERENCE TO RELATED APPLICATIONS

This application claims priority from U.S. provisional patent application No. 62/927,393 filed on Oct. 29, 2019. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for exploiting sidelink (SL) with simultaneous mode 1 and mode 2 transmission for load balancing and mode switching.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One example embodiment may be directed to a method that may include configuring, by a network node, a sidelink (SL) UE to use simultaneous SL mode 1 and mode 2 for one or more SL logical channels (LCH(s)), and configuring the SL UE with a plurality of transmission patterns related to the use of the SL mode 1 or mode 2.

In a variant, the transmission patterns may indicate or include a packet split ratio, information on the sequential usage of the SL transmission mode (i.e., mode 1 or mode 2), and/or criterions for the SL UE to select and use the corresponding transmission pattern.

In a variant, the configuring of the SL UE may also include configuring the UE with conditions for triggering a SL LCH to start its dual-mode transmission by using the configured transmission patterns, and/or configuring the UE with the conditions for triggering a SL LCH to switch from the dual-mode back to the single-mode operations.

In a variant, the method may include receiving a message, from the UE, to indicate the UE's selected transmission pattern for the SL LCH(s). According to one variant, the receiving may also include receiving an indication of a reason for the UE using that selected pattern. In some variants, the reason for using the selected pattern may include a high CBR, a low PRR, a large E2E latency, a large number of retransmissions, and/or an RLF. According to a variant, the method may also include performing appropriate actions based on the received reasons.

In a variant, the method may include receiving, from the UE, a BSR that may be based on the selected transmission pattern. In another variant, when a new transmission pattern is selected, the receiving may include receiving an updated BSR and/or receiving a reason for the selection of the new transmission pattern in the same or a separate message.

According to a variant, the method may also include scheduling the transmission based on the received BSR and the transmission pattern, and transmitting the resource allocation to the UE. In another variant, the method may also include transmitting a reconfiguration of SL LCHs and/or transmission patterns to the UE.

Another example embodiment may be directed to a method that may include receiving, by a UE, a configuration to use simultaneous SL mode 1 and mode 2 for one or more SL LCH(s). According to certain embodiments, the method may also include receiving a configuration for a plurality of transmission patterns related to the use of the SL mode 1 or mode 2.

In a variant, the transmission patterns may indicate or include a packet split ratio, information on the sequential usage of the SL transmission mode (i.e., mode 1 or mode 2), and/or criterions for the UE to select and use the corresponding transmission pattern.

According to a variant, the receiving of the configuration may also include receiving a configuration of conditions for triggering a SL LCH to start its dual-mode transmission by using the configured transmission patterns, and/or receiving a configuration of the conditions for triggering a SL LCH to switch from the dual-mode operation back to the single-mode operation.

In some variants, the method may further include selecting or updating a proper transmission pattern from among the configured transmission patterns based on the local sensing and/or measurement results. According to a variant, the method may also include transmitting, to the network node, an indication of the selected or updated transmission pattern for the SL LCH(s). According to a variant, the transmitting may also include transmitting an indication of a reason for using the selected or updated pattern. For instance, in some variants, the reason for using the selected pattern may include a high CBR, a low PRR, a large E2E latency, a large number of retransmissions, and/or an RLF. According to a variant, the method may also include transmitting, to one or more peer SL UE(s), an indication of the selected or updated transmission pattern for the SL LCH(s).

In another variant, the method may further include calculating BSR using the selected or updated transmission pattern and transmitting the BSR to the network node. In a variant, the method may also include providing, to the network node, a reason for the selection of the new transmission pattern in the same or a separate message. In a variant, the method may also include receiving a resource allocation from the network node. According to some variants, the method may also include receiving a reconfiguration of SL LCHs and/or transmission patterns from the network node.

In a variant, the method may also include, based on the mode 1 resource allocated by the network node and the selected mode-2 resource, transmitting packets from a dual-mode SL LCH via the different modes according to the selected transmission pattern. According to a variant, the method may also include performing RLM and using results of the RLM to select the most appropriate transmission mode. For example, in a variant, the transmission pattern may be used to improve the RLM for the different modes, which enables and improves the real-time monitoring of the different modes.

Another example embodiment is directed to an apparatus including at least one processor and at least one memory comprising computer program code. The at least one memory and computer program code may be configured, with the at least one processor, to cause the apparatus at least to perform the method according to any of the example embodiments discussed herein, or any of the variants described above or elsewhere herein.

Another example embodiment is directed to an apparatus that may include circuitry configured to perform the method according to any of the example embodiments discussed herein, or any of the variants described above or elsewhere herein.

Another example embodiment is directed to an apparatus that may include means for performing the method according to any of the example embodiments discussed herein, or any of the variants described above or elsewhere herein.

Another example embodiment is directed to a non-transitory computer readable medium comprising program instructions stored thereon for performing at least the method according to any of the example embodiments discussed herein, or any of the variants described above or elsewhere herein.

BRIEF DESCRIPTION OF THE DRAWINGS

For proper understanding of example embodiments, reference should be made to the accompanying drawings, wherein.

DETAILED DESCRIPTION

Figure 1:
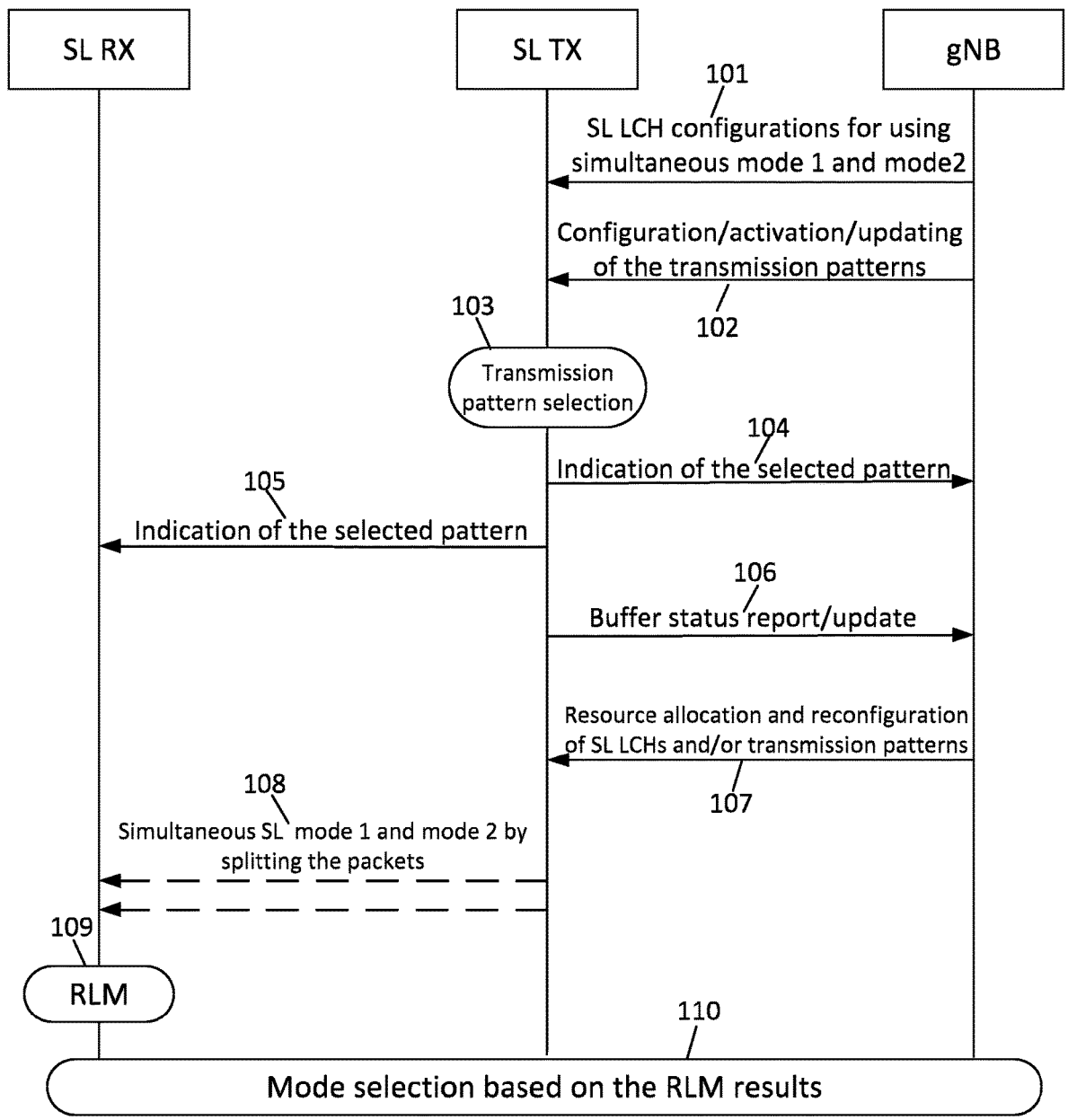
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for exploiting sidelink (SL) with simultaneous mode 1 and mode 2 transmission for load balancing and mode switching, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

New radio (NR) vehicle-to-anything (V2X) is part of the next generation wireless system designed by 3GPP. NR V2X is targeted to be used to serve advanced V2X services, while LTE V2X serves the basic V2X services. One difference between NR V2X and LTE V2X is that NR V2X will allow a user equipment (UE) to use simultaneous network scheduled resource allocation mode (i.e. mode 1) and UE autonomous resource allocation mode (i.e. mode 2).

In other words, NR will provide support for simultaneous configuration of mode 1 and mode 2 for a UE. The transmitter (TX) UE can be configured to operate in mode 1 and/or mode 2. The receiver (RX) UE can receive the transmissions without knowing the resource allocation mode used by the TX UE.

Compared to the LTE V2X, NR V2X is developing new concepts and features to support advanced V2X services. One of these new features is the introduction of simultaneous NR SL mode 1 and mode 2 for a single V2X user equipment (UE) using SL communication.

However, one problem related with the simultaneous mode 1 and mode 2 is how a UE should determine which part of SL data to transmit using mode 1 or mode 2. In principle, a UE may be configured by the network (NW) to realize the simultaneous mode 1 and mode 2, for example, in one or more of the following ways. One way is that a UE could use different modes for different radio access technologies (RATs). For instance, a V2X UE is using the network-scheduled resource allocation mode (i.e. mode 1) for its LTE SL and the UE-autonomous resource allocation mode (i.e. mode 2) for its NR SL. Another way is that a UE could use different modes on different carriers. For example, a V2X UE may use NR mode 1 in carrier-1 since it is camping on carrier-1, while it may use NR mode 2 in carrier-2. Yet another way is that a UE could use different modes based on the operating spectrum. For instance, a V2X UE may use NR mode 1 for SL transmission on licensed spectrum, while using NR mode 2 for SL transmission on un-licensed spectrum.

However, the above-noted options are not flexible enough and can limit the performance improvement of introducing the simultaneous mode 1 and mode 2. When compared to the above options, a SL logical channel (LCH)-based mode selection approach can be more flexible. Under this approach, a SL TX UE can use different modes for different SL LCHs, e.g., it may use NR mode 1 for the SL LCH 1 and the NR mode 2 for SL LCH 2.

It has been proposed to configure one single mode for each SL LCH/SL logical channel group (LCG)/SL radio bearer (RB). As such, a UE can use one and only one transmission mode for each SL LCH/SL LCG/SL RB. In this case, the configuration of the transmission mode should be based on the quality-of-service (QoS) requirements of the SL LCH/SL LCG/SL RB and the network performance of each mode. For instance, if mode 1 can provide better reliability than mode 2, mode 1 will be configured for the SL LCHs with ultra-high reliability requirement. On the other hand, since mode 2 may provide a lower latency than mode 1 due to the fact that mode 2 does not require signaling to request and allocate resources, mode 2 can be applied for the SL LCHs with ultra-low latency requirement. This proposal may be sensible if the QoS requirements (e.g., latency or reliability) of SL LCH can be fulfilled by one single mode in semi-static way. It is noted that these types of SL LCHs are referred to herein as the single-mode SL LCHs. However, this proposal of configuring a single mode for each SL LCH/SL LCG/SL RB poses at least one problem on the NW to configure the proper transmission mode (e.g. mode 1 or mode 2) for a SL LCH. Usually the performance of a transmission mode relies on the real-time conditions experienced by the SL UE, such as channel busy ratio (CBR), SL transmit power, SL channel conditions etc. Thus, the proper transmission mode for a SL LCH can be changed from time to time depending on the real-time conditions the SL UE experienced. Thus, it is difficult for the NW to predict the proper transmission mode for a SL LCH for each specific UE.

In addition, if a SL LCH can be supported by both mode 1 and mode 2, restricting the SL LCH to use only one single mode can reduce the flexibility of resource usage and limit the achievable performance. These SL LCHs, whose QoS requirements can be fulfilled by both SL mode 1 and SL mode 2, are referred to herein as the dual-mode SL LCHs. As mentioned above, one problem from the perspective of resource usage is that, if the traffic load in the configured mode is higher than the traffic load of the other mode, configuring a dual-mode SL LCH with one single mode will pose unnecessary limitations and prevent the dual-mode SL LCH from utilizing the available resources of the other mode.

In LTE V2X, a UE is only allowed to perform SL communication by using one single-mode, i.e., either network scheduled resource allocation mode or UE autonomous resource allocation mode. Thus, a UE in RRC IDLE state applies UE autonomous resource allocation mode for transmitting all the V2X packets. A UE in RRC CONNECTED state can be configured by the network to use either network scheduled resource allocation mode or UE autonomous resource allocation mode for transmitting its V2X packets. In principle, one single-mode is used in an LTE V2X UE to serve all the packets, irrespective of the packet priority and the delay budget.

As discussed above, for NR V2X, a single-mode (i.e., NR SL mode 1 or NR SL mode 2) for each SL LCH/SL logical channel group (LCG)/SL radio bearer (RB) may be configured for an UE. In this case, one SL LCH/SL LCG/SL RB would be configured to use a single SL mode, taking account of the QoS requirements of the SL LCH/SL LCG/SL RB and the performance of each SL mode. For instance, if the SL LCH/SL LCG/SL RB requires an ultra-low latency, the NR SL mode 2 (i.e., UE-autonomous resource selection) might be configured, since the NR SL mode 1 (i.e., NW-scheduled resource allocation) requires additional signaling and latency for the UE to request the transmission resource from the network. Thus, if NR SL mode 1 is used, the additional signaling for resource request and allocation introduces additional latency. On the other hand, the SL LCH/SL LCG/SL RB requiring an ultra-high reliability may be configured to use the NR SL mode 1, since the NW-scheduled resource allocation mode can reduce the packet collision rate and provides a better reliability than the UE-autonomous resource selection mode.

Certain embodiments enable and/or configure a SL LCH to select the transmission mode on a packet-level, i.e., the data from the SL LCH can be transmitted via either mode 1 or mode 2. In some embodiments, operation of a SL LCH can be applied at least for the mode switch procedure, in order to obtain the real-time performance of each mode and select the best transmission mode for the SL LCH, and/or for offloading the traffic from a congested SL mode to the other mode.

According to certain embodiments, when simultaneous mode 1 and mode 2 is configured for a SL UE, multiple transmission patterns related to use mode 1 or mode 2 may also be configured. In an embodiment, the configured transmission patterns may indicate the sequential usage of the SL transmission mode (i.e., either mode 1 or mode 2) for its packets or the packet split ratio between mode 1 and mode 2, in which single-mode operation (i.e., mode-1-only and/or mode-2-only) may be also configured as one of the patterns. In one embodiment, each configured pattern may be associated with the criterions for selecting and using the corresponding transmission pattern. For instance, in case of patterns defined for load-balancing purpose, each pattern may be configured to associate with the mode 2 sensing/measurement results, such as CBR. In case of patterns defined for mode switching, mode-1-only and/or mode-2-only pattern may be configured as a default pattern. The simultaneous mode 1 and mode 2 pattern may be configured to be triggered if the current operation mode has worse performance than the configured threshold.

In some embodiments, a SL TX UE may select the proper transmission pattern, for example based on its local sensing/measurement results and the configurations of transmission patterns discussed above. According to an embodiment, the selected/updated transmission pattern may be indicated to the NW to perform proper actions, e.g., SL LCH transmission mode re-configuration, proper resource allocation, etc. In addition, in one embodiment, the selected/updated transmission pattern may also be indicated to a peer SL RX UE for, e.g., assisting the radio link monitoring (RLM) of each mode.

According to certain embodiments, for a SL LCH/SL LCG/SL UE operating in simultaneous mode 1 and mode 2, the SL buffer status report (BSR) to the NW may be derived by using the selected transmission pattern. In other words, in an embodiment, only the packets to be sent via mode 1 according to the configured/selected transmission pattern will be considered in the BSR.

In an embodiment, a SL UE may also be configured to perform its RLMs separately for the two different SL modes. The RLM results can be used to select the proper SL transmission mode or to switch the transmission interface, e.g., from PC5 interface for SL communication to Uu interface for communication via wireless network in case the performances of both SL modes cannot meet the service requirements. To achieve this, the RLM configuration, especially the RLF related configuration (e.g., corresponding counters and timers), may take into account the transmission pattern. For instance, if separate RLMs/radio link failures (RLFs) on mode 1 and mode 2 are configured, the configured pattern may allow the UE to detect and recover the radio problem based on the number of consecutive Out-of-Sync/In-Sync indications for each transmission mode respectively.

It should be noted that example embodiments may be applied for each SL UE, or each SL LCG or each SL LCH, which may depend on the transmission mode configuration and/or resource allocation granularity in the system.

FIG. 1 illustrates an example of a signaling diagram depicting certain embodiments. It is noted that in FIG. 1, SL TX and SL RX may represent SL TX and RX UE respectively. As illustrated in the example of FIG. 1, at 101, a SL TX UE may be configured to use the simultaneous mode 1 and mode 2 for one, more or all SL LCHs (i.e., dual-mode SL LCHs), whereas other SL LCHs may be single-mode only. For instance, if a SL LCH is deemed as only available via a specific SL mode due to its strict QoS requirements, it may not be enabled for simultaneous mode 1 and mode 2 for the time being.

In addition, in an embodiment, the UE may also be configured with the conditions for using the proper transmission mode. For example, according to some embodiments, the UE may be configured with the conditions for triggering a SL LCH to start its dual-mode transmission by using the transmission pattern(s) indicated in the following procedure. The triggering conditions may be e.g., the traffic load of the current in-use mode is increasing, the performance of the current in-use SL mode is degrading, capabilities to be supported by the link has changed, etc. In an embodiment, the UE may be configured with the conditions to trigger a SL LCH to switch from the dual-mode back to the single-mode operations. For example, if the performance of one SL mode (e.g., packet reception ratio (PRR), packet end-to-end (E2E) latency) and/or the CBR of this SL mode is worse or higher than a threshold, a dual-mode SL LCH may be switched to use the single SL mode having better performance. It is noted that procedure 1 may be combined with procedure 102 (discussed below) at least for, e.g., the initial configuration, in order to send the configuration in a single message.

As further illustrated in the example of FIG. 1, at 102, a SL LCH capable of using dual-mode may be configured with multiple transmission patterns. In an embodiment, each of the transmission patterns may indicate the sequential usage of the SL transmission mode (i.e., mode 1 or mode 2) for its packets, if the triggering condition(s) discussed above is detected. It is noted that the mode-1-only and/or mode-2-only pattern can be configured as one of the patterns in the configuration.

According to certain embodiments, the contents of a transmission pattern may contain at least some of the following information: packet split ratio, detailed sequential information, and/or criterions for the UE to select and use the corresponding transmission pattern.

In an embodiment, the packet split ratio is the ratio of the data transmissions via mode 1 to the data transmissions via mode 2 or vice versa for each transmission pattern. Different packet split ratios can be used under different conditions. For instance, if the traffic load in the current in-use SL mode A starts getting congested and it achieves a threshold of $S_0$, a traffic pattern with a ratio $R_0$ of using SL mode A can be used to offload the SL data to the other mode, i.e., SL mode B. As another example, if the traffic load in SL mode A continues increasing and a higher threshold of $S_1$ is achieved, the SL data can be offloaded to SL mode B by selecting another pattern with an even lower ratio $R_1$ ($R_1<R_0$) of using SL mode A. Since the traffic load in one SL mode can be measured by the UE, different UEs may experience different traffic loads and select different transmission patterns for SL data transmission.

In an embodiment, the detailed sequential information may include a pattern that may be configured with more detailed sequential information by using a periodical sequence. For example, a sequence of [111000] can be used to represent that the first three packets from the SL UE/SL LCG/SL LCH will be transmitted in a different mode compared with the following next three packets. This sequential information can be periodically applied. In some examples, the packet split ratio may be derived from the detailed sequential information.

As introduced above, a transmission pattern may contain criterions for a UE to select and use the corresponding transmission pattern. For example, in an embodiment, each pattern can be configured with the applied conditions/events that are sensed/measured by the UE, e.g., a range of CBR, PRR, packet E2E latency, radio link monitoring results, such as the number of retransmissions in one SL mode or the number of in-sync/out-of-sync indications. Thus, a UE may select the transmission pattern for the SL LCH based on its local sensed/measured conditions. For instance, if the CBR of the current in-use SL mode is much higher than the CBR of the other SL mode, the SL UE can be triggered to switch one or multiple SL LCH(s) to dual-mode for transmitting its packets via two SL modes, in order to offload the traffic from one SL mode to another. In another example, if the SL UE experiencing a performance deterioration, such as a low PRR, a large packet E2E latency, a large number of retransmission attempts, or many out-of-sync indications from the physical layer especially from one SL mode related transmission only, the SL LCH can also be triggered to select another transmission pattern and split its traffic via mode 1 and mode 2 in different way. It is noted that in certain embodiments the triggering events can even be detected before an RLF happens. Thus, based on the real-time performances experienced, a UE can proactively switch to dual mode or even the other suitable SL transmission mode, which reduces the RLF risk and/or improves the service availability. Otherwise, if the UE remains with the single SL mode whose performance is degrading, then an RLF may occur or its performance would no longer meet the QoS requirements. In that case, the SL mode may be considered as unavailable and the corresponding services will be disabled, which reduces the service availability.

It is noted that a single-mode SL UE/SL LCG/SL LCH may be configured as a special case of dual-mode SL UE/SL LCG/SL LCH. It may depend on the real-time system conditions/performance of each mode, e.g., UE-experienced CBR, PRR, and packet E2E latency for the SL UE to switch between different dual-mode pattern including single mode operation as one of the patterns. Thus, using the transmission pattern to transmit the packets via different SL modes enables a SL UE to proactively monitor the performances of different modes and to switch to the most appropriate mode.

In certain embodiments, multiple patterns with the same packet split ratio may be configured, in order to protect security and privacy for a special/sensitive SL LCH. In this case, the SL LCH can periodically switch among different patterns, e.g., which makes it difficult for a jammer to track the SL transmission.

According to some embodiments, the configuration of the transmission patterns can be performed using different approaches. For example, the NW can configure the patterns by using broadcast signalling and/or dedicated signalling. Alternatively, the transmission patterns can be pre-configured in the SL TX UE. As another option, if a list of patterns is pre-configured at the SL TX UE, the NW may signal the feasible patterns by using indicators or pointer, in order to save signalling effort. Otherwise, if the NW needed to always transmit the full content of the feasible patterns, it may introduce a large signalling effort. As another benefit of this approach, the NW preserves the possibility to activate/deactivate the appropriate patterns based on its real-time system conditions. For instance, if the NW experiences an ultra-high traffic load in one SL mode, it can force the dual-mode SL LCHs to offload more data to the other SL mode by activating only those patterns that transmit less data via the congested SL mode. As yet another option, a UE may be configured or pre-configured with a rule to derive the proper pattern(s), which can be a function of different terms, such as CBRs from different SL modes.

Referring again to the example of FIG. 1, at 103, if the condition(s) received at 101 is detected and a SL UE/SL LCG/SL LCH is triggered to apply the dual-mode transmission, the SL TX UE may select the proper transmission pattern, based on its local sensing/measurement results and the configurations from received at 102. At 104, the SL TX may send a message to the NW to indicate its selected transmission pattern for the SL LCH. In addition, in an embodiment, a reason for using that selected pattern may also be indicated to the NW. For instance, the reason for using the selected pattern may include: a high CBR, a low PRR, a large E2E latency, a large number of retransmissions, and/or an RLF.

In certain embodiments, the information received from a SL TX can help the NW to take proper actions. For example, if the NW receives multiple messages from different UEs with the same reason (e.g., a high CBR is experienced), the NW can detect that the configured mode of the SL UE/SL LCG/SL LCH may not be proper any more, and it may reconfigure the other served UEs to trigger their simultaneous mode 1 and mode 2 already, instead of waiting for the triggering events that will be measured by the respective UEs. As another example, when the NW receives multiple messages from different UEs with the same reason, the NW may re-configure the served UEs. For instance, if multiple SL TX UEs report their RLFs from one SL transmission mode, the NW can re-configure the conditions that trigger the dual-mode transmission, so that the SL UE/SL LCG/SL LCH can start using the dual-mode earlier than that an RLF takes place. Thus, this approach can effectively and proactively enable a UE to switch to the other mode and reduce the risk of RLFs.

As also illustrated in the example of FIG. 1, at 105, the used pattern may also be sent/updated to the peer UE(s), in order for the peer UE(s) to perform the radio link monitoring efficiently, as discussed in more detail below. At 106, based on the selected transmission pattern, the BSR may be calculated accordingly and reported to the NW, e.g., in one example only the packets to be sent via mode 1 will be considered by the BSR. Moreover, when a new transmission pattern is selected, the content of the BSR may be recalculated accordingly and the new buffer status may be updated to the NW. The reason for selecting a new transmission pattern (e.g., one of the reasons shown at 104) may also be indicated to the NW, e.g., by using a separate message.

In one embodiment, based on the received BSR and the transmission pattern, at 107, the NW may schedule the SL transmissions correspondingly and may send its resource allocation to the UE. For instance, if the transmission pattern shows multiple consecutive packets will be transmitted via the SL mode 2 from a future time instance $T_1$ to $T_2$, the NW may configure the resources (e.g., semi-persistent scheduling (SPS) or configured grant (CG) type of resources) that are valid only until $T_1$. Thus, the NW may perform its resource allocation algorithm again after those consecutive packets have been transmitted via the SL mode 2, i.e., the time instance $T_2$. Moreover, if the BSR has been updated, the associated reason can be used by the NW to adjust its configuration, as mentioned above.

Continuing with the example of FIG. 1, based on the mode-1 resource allocated by the NW and the mode-2 resource selected by the UE, at 108, the SL TX UE may transmit its packets via different modes according to the selected transmission pattern. At 109, it may be possible for the SL RX UE to use the transmission pattern to improve its RLM. In case the transmission pattern is not available at the SL RX, the SL RX can only detect a packet reception failure if the SL RX has successfully decoded the SL control information (SCI) from the physical SL control channel (PSCCH) but not receive the SL data packet from the physical SL shared channel (PSSCH). However, if the SL channel condition is not good enough, SCI may not be successfully decoded, and the SL RX cannot detect the reception failure of the corresponding packet as SL RX UE is not aware of the transmission from SL TX UE. However, if the transmission pattern is available at the SL RX, it may be helpful for the SL RX to detect the packet loss from one specific mode. For instance, if the transmission pattern (e.g., a sequence of [101010 . . . 1010]) indicates that each packet should be transmitted via a different mode compared with the previous packet and each mode operates on a separate resource pool, the SL RX may detect a packet loss transmitted via one mode (e.g. SL mode B) if it receives two consecutive packets from the resource pool of another single mode, e.g., SL mode A. Correspondingly, the physical layer can indicate an out-of-sync to the higher layers, which will be counted for the mode, e.g., SL mode B. In this way, the indication received from the physical layer for detecting the RLF can be considered for mode 1 and mode 2 separately, based on the transmission pattern. Thus, as shown at 109 in FIG. 1, the SL RX can use the transmission pattern to improve its RLMs for the different modes, which enables and improves the real-time monitoring of the different modes.

As further illustrated in the example of FIG. 1, at 110, the RLM results from the different modes can be used by the SL UE(s)—SL TX and/or SL RX—to select the most proper transmission mode. For example, if both SL modes perform well, the SL TX can remain with the simultaneous mode 1 and mode 2 to balance the traffic between different modes. Alternatively, it may also switch to the single-mode transmission by using the most appropriate mode, e.g., the one with the best performance. As another example, if one SL mode has a bad performance that does not meet the QoS requirements of the SL LCH, the SL TX can adapt its future transmissions by using the other mode only. As yet another example, if both SL modes have difficulties in meeting the QoS requirements of the SL LCH, the SL TX may switch its transmission to use the Uu interface.

It is noted that example embodiments apply not only for packet split between SL mode 1 and mode 2, but also in other scenarios. For instance, the different patterns may also be applied for packet split between transmissions via Uu and PC5, in order to select the most appropriate transmission interface in real-time and to offload traffic from one interface to another one.

Figure 2A:
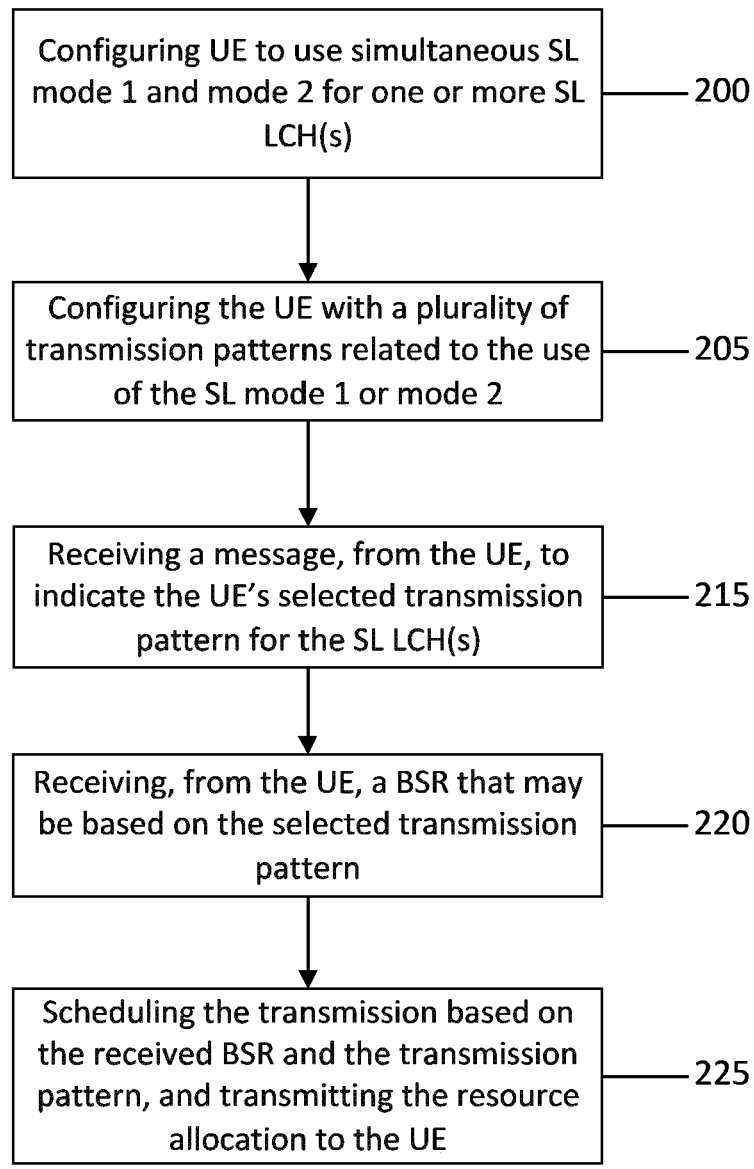
FIG. 2a illustrates an example flow diagram of a method, according to an embodiment.

FIG. 2*a* illustrates an example flow diagram of a method of selecting and applying a SL transmission mode, according to one example embodiment. In certain example embodiments, the flow diagram of FIG. 2*a* may be performed by a NW entity or NW node in a communication system, such as LTE or 5G NR. For instance, in some example embodiments, the NW node performing the method of FIG. 2*a* may include a base station, eNB, gNB, and/or NG-RAN node.

As illustrated in the example of FIG. 2*a*, the method may include, at 200, configuring a SL UE to use simultaneous SL mode 1 and mode 2 for one or more SL LCH(s). For example, the configuring 200 may include configuring a SL TX to use the simultaneous mode 1 and mode 2 for certain SL LCHs (i.e., dual-mode SL LCHs), while other SL LCHs may be single-mode. If the UE is configured with the simultaneous mode 1 and mode 2, the method may also include, at 205, configuring the UE with a plurality of transmission patterns related to the use of mode 1 or mode 2. In an embodiment, as discussed in more detail above in connection with FIG. 1, the transmission patterns may indicate or include a packet split ratio, information on the sequential usage of the SL transmission mode (i.e., mode 1 or mode 2), and/or criterions for the UE to select and use the corresponding transmission pattern.

In some embodiments, the configuring at 200 or 205 may further include configuring the UE with conditions for triggering a SL LCH to start its dual-mode transmission by using the transmission patterns configured at 205, and/or configuring the UE with the conditions for triggering a SL LCH to switch from the dual-mode back to the single-mode operations. In some embodiments, the configuring at 205 may be combined and/or performed simultaneously with the configuring at 200.

In an embodiment, the method may include, at 215, receiving a message, from the UE, to indicate the UE's selected transmission pattern for the SL LCH(s). According to one embodiment, the receiving 215 may also include receiving an indication of a reason for the UE using that selected pattern. For instance, the reason for using the selected pattern may include a high CBR, a low PRR, a large E2E latency, a large number of retransmissions, and/or an RLF. According to certain embodiments, the method may also include performing appropriate actions based on the received reasons. For example, when multiple messages are received from different UEs having the same reason (e.g., a high CBR is experienced), the method may include detecting that the configured mode of the SL LCH may no longer be proper, and reconfiguring the other served UEs to start their simultaneous mode 1 and mode 2, rather than waiting for the previously configured triggering events. As another example, when multiple messages are received from different UEs having the same reason, the method may include re-configuring the served UEs.

In an embodiment, the method of FIG. 2*a* may optionally include, at 220, receiving, from the UE, a BSR that may be based on the selected transmission pattern. Further, in an embodiment, when a new transmission pattern is selected, the receiving 220 may include receiving an updated BSR and/or receiving a reason for the selection of the new transmission pattern in the same or a separate message.

According to certain embodiments, the method of FIG. 2*a* may also include, at 225, scheduling the transmission based on the received BSR and the transmission pattern, and transmitting the resource allocation to the UE. In an embodiment, the method may also include transmitting a reconfiguration of SL LCHs and/or transmission patterns to the UE.

Figure 2B:
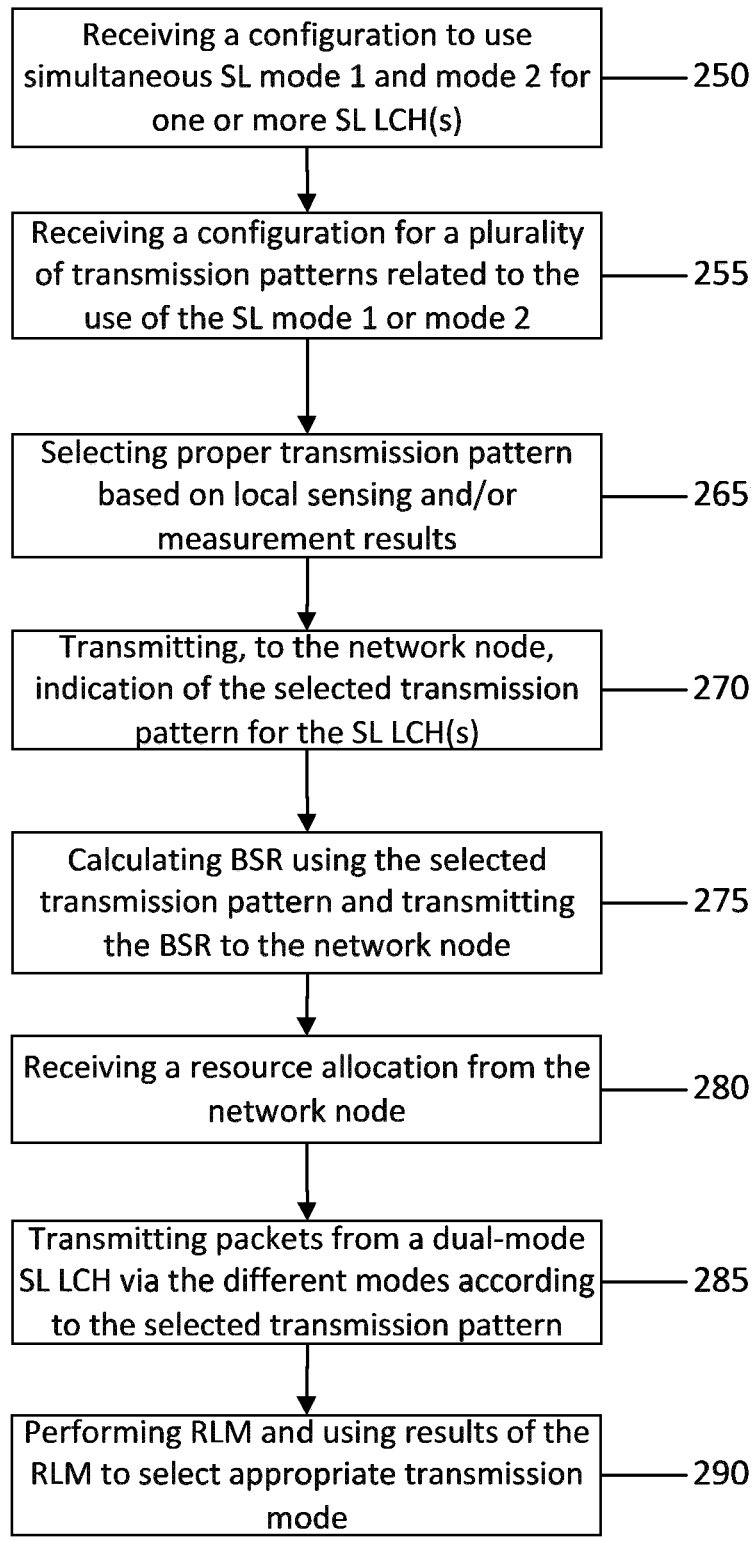
FIG. 2b illustrates an example flow diagram of a method, according to an embodiment.

FIG. 2*b* illustrates an example flow diagram of a method for selecting and applying a SL transmission mode, according to one example embodiment. In certain example embodiments, the flow diagram of FIG. 2*b* may be performed by a NW entity or NW node in a communications system, such as LTE or 5G NR. For instance, in some example embodiments, the network entity performing the method of FIG. 2*b* may be a UE, such as a SL UE (e.g., SL TX UE or SL RX UE), mobile station, IoT device, or the like.

In an embodiment, the method of FIG. 2*b* may include, at 250, receiving, from a network node (e.g., gNB), a configuration to use simultaneous SL mode 1 and mode 2 for one or more SL LCH(s). According to certain embodiments, the method may also include, at 255, receiving a configuration for a plurality of transmission patterns related to the use of the SL mode 1 or mode 2. For instance, as discussed in detail above with FIG. 1, the transmission patterns may indicate or include a packet split ratio, information on the sequential usage of the SL transmission mode (i.e., mode 1 or mode 2), and/or criterions for the UE to select and use the corresponding transmission pattern.

In some embodiments, the receiving at 250 or 255 may further include receiving a configuration of conditions for triggering a SL LCH to start its dual-mode transmission by using the transmission patterns configured at 255, and/or receiving a configuration of the conditions for triggering a SL LCH to switch from the dual-mode operation back to the single-mode operation.

In some embodiments, the method of FIG. 2*b* may further include, at 265, selecting or updating a proper transmission pattern from among the configured transmission patterns based on the local sensing and/or measurement results. According to an embodiment, the method may also include, at 270, transmitting, to the network node, an indication of the selected or updated transmission pattern for the SL LCH(s). According to one embodiment, the transmitting 270 may also include transmitting an indication of a reason for using the selected or updated pattern. For instance, the reason for using the selected pattern may include a high CBR, a low PRR, a large E2E latency, a large number of retransmissions, and/or an RLF. According to certain embodiments, the method may also include transmitting, to one or more peer SL UE(s), an indication of the selected or updated transmission pattern for the SL LCH(s). This may enable the peer SL UE(s) to perform RLM efficiently.

According to an embodiment, the method of FIG. 2*b* may optionally include, at 275, calculating BSR using the selected or updated transmission pattern and transmitting the BSR to the network node. For example, in an embodiment, the packets to be sent via mode 1 will be considered by the BSR. In certain embodiments, the method may also include providing, to the network node, a reason for the selection of the new transmission pattern in the same or a separate message. In one embodiment, the method may also include, at 280, receiving a resource allocation from the network node. According to some embodiments, the method may also include receiving a reconfiguration of SL LCHs and/or transmission patterns from the network node.

In certain embodiments, the method of FIG. 2b may also include, at 285, based on the mode 1 resource allocated by the network node and the selected mode-2 resource, transmitting packets via the different modes according to the selected transmission pattern. According to an embodiment, the method may optionally include, at 290, performing RLM and using results of the RLM to select the most appropriate transmission mode. For example, the transmission pattern may be used to improve the RLM for the different modes, which enables and improves the real-time monitoring of the different modes. As a result, if both SL modes perform well, the method may include remaining with the simultaneous mode 1 and mode 2 to balance traffic between the different modes. Alternatively, the method may include switching to the single-mode transmission by using the most appropriate mode, e.g., the one with the best performance. As another example, if one SL mode has performance that does not meet the QoS requirements of the SL LCH, the method may include adapting future transmissions by using the other mode only. As yet another example, if both SL modes have difficulties in meeting the QoS requirements of the SL LCH, the method may include switching transmission to use the Uu interface.

It should be noted that one or more of the procedures, functions or blocks illustrated in FIG. 1, 2a, or 2b may be optional or may be skipped, according to certain embodiments. As such, FIGS. 1, 2a, and 2b illustrate some embodiments, but embodiments should not be considered to be limited to these examples alone.

Figure 3A:
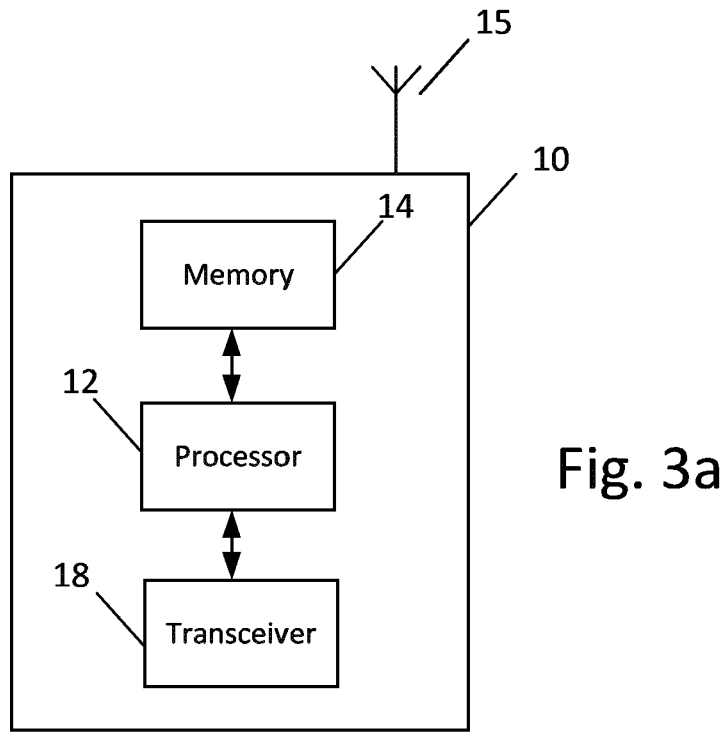
FIG. 3a illustrates an example block diagram of an apparatus, according to an embodiment.

FIG. 3a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a NW node or RAN node, such as a base station, access point, Node B, eNB, gNB, WLAN access point, or the like. In another example, in some embodiments, apparatus 10 may include a SL UE that perform SL transmission to SL RX UE. For example, in some embodiments, apparatus 10 may be configured to perform one or more of the processes depicted in any of the flow charts or signaling diagrams described herein, such as those illustrated in FIG. 1, 2a or 2b. In some embodiments, as discussed herein, apparatus 10 may be configured to perform a procedure relating to selecting and/or applying SL transmission mode for dual-mode SL LCHs, for instance.

According to certain embodiments, apparatus 10 may be controlled by memory 14 and processor 12 to configure a SL UE to use simultaneous SL mode 1 and mode 2 for one or more SL LCH(s). For example, apparatus 10 may be controlled by memory 14 and processor 12 to configure a SL TX to use the simultaneous mode 1 and mode 2 for certain SL LCHs (i.e., dual-mode SL LCHs), while other SL LCHs may be single-mode. In an embodiment, apparatus 10 may be further controlled by memory 14 and processor 12 to configure the UE with a plurality of transmission patterns related to the use of mode 1 or mode 2. In some embodiments, the transmission patterns may indicate or include a packet split ratio, information on the sequential usage of the SL transmission mode (i.e., mode 1 or mode 2), and/or criterions for the UE to select and use the corresponding transmission pattern.

In an embodiment, apparatus 10 may be controlled by memory 14 and processor 12 to configure the UE with conditions for triggering a SL LCH to start its dual-mode transmission by using the transmission patterns configured at 205, and/or to configure the UE with the conditions for triggering a SL LCH to switch from the dual-mode back to the single-mode operations.

In an embodiment, apparatus 10 may be controlled by memory 14 and processor 12 to receive a message, from the UE, to indicate the UE's selected transmission pattern for the SL LCH(s). According to one embodiment, apparatus 10 may be controlled by memory 14 and processor 12 to also receive an indication of a reason for the UE using that selected pattern. For instance, the reason for using the selected pattern may include a high CBR, a low PRR, a large E2E latency, a large number of retransmissions, and/or an RLF. According to certain embodiments, apparatus 10 may be controlled by memory 14 and processor 12 to perform appropriate actions based on the received reasons. For example, when multiple messages are received from different UEs having the same reason (e.g., a high CBR is experienced), apparatus 10 may be controlled by memory 14 and processor 12 to detect that the configured mode of the SL LCH may no longer be proper, and to reconfigure the other served UEs to start their simultaneous mode 1 and mode 2, rather than waiting for the previously configured triggering events. As another example, when multiple messages are received from different UEs having the same reason, apparatus 10 may be controlled by memory 14 and processor 12 to re-configure the served UEs.

In an embodiment, apparatus 10 may be controlled by memory 14 and processor 12 to receive, from the UE, a BSR that may be based on the selected transmission pattern. Further, in an embodiment, when a new transmission pattern is selected, apparatus 10 may be controlled by memory 14 and processor 12 to receive an updated BSR and/or receive a reason for the selection of the new transmission pattern in the same or a separate message. According to certain embodiments, apparatus 10 may be controlled by memory 14 and processor 12 to schedule the transmission based on the received BSR and the transmission pattern, and to transmit the resource allocation to the UE. In an embodiment, apparatus 10 may be controlled by memory 14 and processor 12 to transmit a reconfiguration of SL LCHs and/or transmission patterns to the UE.

Figure 3B:
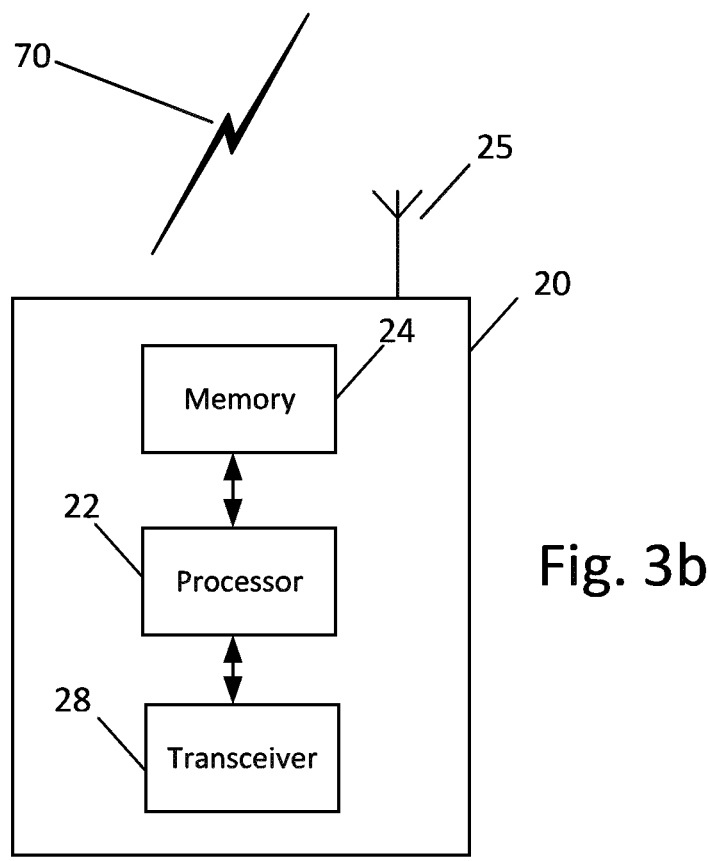
FIG. 3b illustrates an example block diagram of an apparatus, according to an embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3*b*.

As illustrated in the example of FIG. 3*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UVVB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may foil a part of transceiving circuitry.

As discussed above, according to some embodiments, apparatus 20 may be a UE (e.g., SL UE), mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, 2*a* or 2*b*. In certain embodiments, apparatus 20 may include or represent a UE, such as a SL UE, and may be configured to perform procedure relating to configuring and/or applying mode selection for dual-mode SL LCHs, for instance.

In certain embodiments, apparatus 20 may be controlled by memory 24 and processor 22 to receive, from a network node (e.g., gNB), a configuration to use simultaneous SL mode 1 and mode 2 for one or more SL LCH(s). According to certain embodiments, apparatus 20 may be controlled by memory 24 and processor 22 to receive a configuration for a plurality of transmission patterns related to the use of the SL mode 1 or mode 2. For instance, as discussed above, the transmission patterns may indicate or include a packet split ratio, information on the sequential usage of the SL transmission mode (i.e., mode 1 or mode 2), and/or criterions for the UE to select and use the corresponding transmission pattern.

According to an embodiment, apparatus 20 may be further controlled by memory 24 and processor 22 to receive a configuration of conditions for triggering a SL LCH to start its dual-mode transmission by using the configured transmission patterns, and/or to receive a configuration of the conditions for triggering a SL LCH to switch from the dual-mode operation back to the single-mode operation.

In some embodiments, apparatus 20 may be controlled by memory 24 and processor 22 to select or update a proper transmission pattern from among the configured transmission patterns based on the local sensing and/or measurement results. According to an embodiment, apparatus 20 may then be controlled by memory 24 and processor 22 to transmit, to the network node, an indication of the selected or updated transmission pattern for the SL LCH(s). According to one embodiment, apparatus 20 may be controlled by memory 24 and processor 22 to transmit an indication of a reason for using the selected or updated pattern. For instance, the reason for using the selected pattern may include a high CBR, a low PRR, a large E2E latency, a large number of retransmissions, and/or an RLF. According to certain embodiments, apparatus 20 may be controlled by memory 24 and processor 22 to transmit, to one or more peer SL UE(s), an indication of the selected or updated transmission pattern for the SL LCH(s), which may enable the peer SL UE(s) to perform RLM efficiently.

According to an embodiment, apparatus 20 may be controlled by memory 24 and processor 22 to calculate BSR using the selected or updated transmission pattern and to transmit the BSR to the network node. For example, in an embodiment, the packets to be sent via mode 1 would be considered by the BSR. In certain embodiments, apparatus 20 may be controlled by memory 24 and processor 22 to provide, to the network node, a reason for the selection of the new transmission pattern in the same or a separate message. In one embodiment, apparatus 20 may be controlled by memory 24 and processor 22 to receive a resource allocation from the network node. According to some embodiments, apparatus 20 may be controlled by memory 24 and processor 22 to receive a reconfiguration of SL LCHs and/or transmission patterns from the network node.

In certain embodiments, apparatus 20 may be controlled by memory 24 and processor 22 to, based on the mode 1 resource allocated by the network node and the selected mode-2 resource, transmit packets from a dual-mode SL LCH via the different modes according to the selected transmission pattern. According to an embodiment, apparatus 20 may be controlled by memory 24 and processor 22 to perform RLM and use results of the RLM to select the most appropriate transmission mode. For example, the transmission pattern may be used to improve the RLM for the different modes, which enables and improves the real-time monitoring of the different modes. As one example, if both SL modes perform well, apparatus 20 may be controlled by memory 24 and processor 22 to remain with the simultaneous mode 1 and mode 2 to balance traffic between the different modes. Alternatively, apparatus 20 may be controlled by memory 24 and processor 22 to switch to the single-mode transmission by using the most appropriate mode, e.g., the one with the best performance. As another example, if one SL mode has performance that does not meet the QoS requirements of the SL LCH, apparatus 20 may be controlled by memory 24 and processor 22 to adapt future transmissions by using the other mode only. As yet another example, if both SL modes have difficulties in meeting the QoS requirements of the SL LCH, apparatus 20 may be controlled by memory 24 and processor 22 to switch transmission to use the Uu interface.

Therefore, certain example embodiments provide several technological improvements, enhancements, and/or advantages over existing technological processes and constitute an improvement at least to the technological field of wireless network control and management. For example, certain embodiments enable a SL LCH to apply the simultaneous mode 1 and mode 2 transmission. Some embodiments can allow a UE to balance the traffic loads of the different SL modes by offloading some data from one SL mode to another mode. Additionally, by splitting the data transmission of a SL UE/SL LCG/SL LCH via two different modes, certain embodiments allow a UE to measure its real-time performance on each of the modes. Thus, example embodiments provide good accuracy and confidence for determining a proper mode for transmitting the packets from the SL LCH. Furthermore, according to certain embodiments, a UE can proactively determine to switch to another SL mode for the SL LCH(s), based on its real-time performance measurement from the different modes. This can reduce the chance of an RLF and improves the service availability, compared to the case where a SL LCH sticks to only one single SL mode. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. An apparatus, comprising:
   at least one processor; and
   at least one memory comprising computer program code, the at least one memory and computer program code when executed by the at least one processor, to cause the apparatus at least to:
      configure at least one sidelink (SL) user equipment (UE) to simultaneously use sidelink (SL) mode 1 and SL mode 2 for a dual-mode SL logical channel LCH, wherein the SL mode 1 is a network scheduled resource allocation mode and SL mode 2 is an autonomous resource allocation mode; and
      configure a dual-mode sidelink SL UE with a plurality of transmission patterns that simultaneously use the SL mode 1 and the SL mode 2 via the SL LCH;
      during a first period time:
         detect an ultra-high traffic load in the SL mode 1;
         based on detecting the ultra-high traffic load in the SL mode 1, select a first transmission pattern from the plurality of transmission patterns, the first transmission pattern comprising a first packet split ratio, first detailed sequential information, and first criterions for the UE to select and use the first transmission pattern; and
         transmit a first set of packets using the first transmission pattern by transmitting less data via the SL mode 1 based on the first packet split ratio;
      during a second period of time:
         detect a channel busy ratio (CBR) that exceeds a CBR threshold;
         based on detecting the CBR that exceeds the CBR threshold, select a second transmission pattern from the plurality of transmission patterns, the second transmission comprising a second packet split ratio, second detailed sequential information, and second criterions for the UE to select and use the second transmission pattern; and
         transmit a second set of packets using the second transmission pattern, wherein the second packet split ratio is different than the first packet split ratio; during a third period of time:
         detect a packet reception ratio (PRR) that is below a PRR threshold;
         based on detecting the PRR that is below the PRR threshold, select a third transmission pattern from the plurality of transmission patterns, the third transmission pattern comprising a third packet split ratio, third detailed sequential information, and third criterions for the UE to select and use the third transmission pattern; and
         transmit a third set of packets using the third transmission pattern, wherein the third packet split ratio is different than the first packet split ratio and the second packet split ratio;
      during a fourth period of time:
         detect a packet end-to-end latency (E2E) that exceeds an E2E threshold;
         based on detecting the packet E2E that exceeds the E2E threshold, select a fourth transmission pattern from the plurality of transmission patterns, the fourth transmission pattern comprising a fourth packet split ratio, fourth detailed sequential information, and fourth criterions for the UE to select and use the fourth transmission pattern; and
         transmit a fourth set of packets using the fourth transmission pattern, wherein the fourth packet split ratio is different than the first packet split ratio, the second packet split ratio, and the third packet split ratio;
      during a fifth period of time:
         detect that a number of retransmission exceeds a retransmission threshold;
         based on detecting that the number of retransmission exceeds the retransmissions threshold, select a fifth transmission pattern from the plurality of transmission pattern, the fifth transmission pattern comprising a fifth packet split ratio, fifth detailed sequential information, and fifth criterions for the UE to select and use the fifth transmission pattern; and
         transmit a fifth set of packets using the fifth transmission pattern, wherein the fifth packet split ratio is different than the first packet split ratio, the second packet split ratio, the third packet split ratio, and the fourth packet split ratio; and
      during a sixth period of time:
         based on a current measurement of the CBR, the PRR, the packet E2E, and the number of retransmissions, select a sixth transmission pattern from the plurality of transmission patterns, the sixth transmission pattern comprising a sixth packet split ratio, sixth detailed sequential information, and sixth criterions for the UE to select and use the sixth transmission pattern; and
         transmit a sixth set of packets using the sixth transmission pattern, wherein the sixth packet split ratio is different than the first packet split ratio, the second packet split ratio, the third packet split ratio, the fourth packet split ratio, and the fifth packet split ratio,
      wherein a packet split ratio is a ratio of data transmissions via the SL mode 1 to data transmissions via the SL mode 2.

2. The apparatus according to claim 1, wherein, to configure the at least one dual-mode sidelink (SL) user equipment (UE), the at least one memory and computer program code when executed by the at least one processor, to cause the apparatus to configure the at least one dual-mode SL UE with conditions for triggering an SL LCH to start its dual-mode transmission by using the configured transmission patterns.

3. The apparatus according to claim 1, wherein the at least one memory and computer program code when executed by the at least one processor, to cause the apparatus at least to:
receive a message, from the dual-mode SL sidelink UE, to indicate the dual-mode SL UE's selected transmission pattern for the SL LCH.

4. The apparatus according to claim 3, wherein, to receive the message, the at least one memory and computer program when executed by the at least one processor, to cause the apparatus at least to receive an indication of a reason for the at least one dual-mode SL UE using that selected transmission pattern.

5. The apparatus according to claim 4, wherein the at least one memory and computer program code when executed by the at least one processor, to cause the apparatus at least to perform appropriate actions based on the received indication of the reason.

6. The apparatus according to claim 5, wherein the at least one memory and computer program code are configured, with the at least one processor, to cause the apparatus at least to:
receive, from the SL UE, a buffer status report (BSR) based on a selected transmission pattern.

7. The apparatus according to claim 5, wherein, when a new transmission pattern is selected by the SL UE, the at least one memory and computer program code when executed by the at least one processor, cause the apparatus at least to receive an updated buffer status report (BSR) and a reason for the selection of the new transmission pattern in a same or a separate message.

8. The apparatus according to claim 6, wherein the at least one memory and the computer program code when executed by the at least one processor, to cause the apparatus at least to:
schedule a transmission based on the received buffer status report (BSR) and the selected transmission pattern; and
transmit a resource allocation to the at least one SL UE.

9. The apparatus according to claim 1, wherein the apparatus is a network entity.

10. An apparatus, comprising:
at least one processor; and
at least one memory comprising computer program code that when executed by the at least one processor, cause the apparatus at least to:
receive a configuration to simultaneously use sidelink (SL) mode 1 and SL mode 2 for a dual-mode sidelink (SL) logical channel LCH;
receive a configuration for a plurality of transmission patterns for simultaneously using the SL mode 1 and the SL mode 2;
during a first period time:
detect an ultra-high traffic load in the SL mode 1;
based on detecting the ultra-high traffic load in the SL mode 1, select a first transmission pattern from the plurality of transmission patterns, the first transmission pattern comprising a first packet split ratio, first detailed sequential information, and first criterions for the UE to select and use the first transmission pattern; and
transmit a first set of packets using the first transmission pattern by transmitting less data via the SL mode 1 based on the first packet split ratio;
during a second period time:
detect a channel busy ratio (CBR) that exceeds a CBR threshold;
based on detecting the CBR that exceeds the CBR threshold, select a second transmission pattern from the plurality of transmission patterns, the second transmission comprising a second packet split ratio, second detailed sequential information, and second criterions for the UE to select and use the second transmission pattern; and
transmit a second set of packets using the second transmission pattern, wherein the second packet split ratio is different than the first packet split ratio; during a third period time:
detect a packet reception ratio (PRR) that is below a PRR threshold;
based on detecting the PRR that is below the PRR threshold, select a third transmission pattern from the plurality of transmission patterns, the third transmission pattern comprising a third packet split ratio, third detailed sequential information, and third criterions for the UE to select and use the third transmission pattern; and
transmit a third set of packets using the third transmission pattern, wherein the third packet split ratio is different than the first packet split ratio and the second packet split ratio;
during a fourth period time:
detect a packet end-to-end latency (E2E) that exceeds an E2E threshold;
based on detecting the packet E2E that exceeds the E2E threshold, select a fourth transmission pattern from the plurality of transmission patterns, the fourth transmission pattern comprising a fourth packet split ratio, fourth detailed sequential information, and fourth criterions for the UE to select and use the fourth transmission pattern; and
transmit a fourth set of packets using the fourth transmission pattern, wherein the fourth packet split ratio is different than the first packet split ratio, the second packet split ratio, and the third packet split ratio;
during a fifth period time:
detect that a number of retransmission exceeds a retransmission threshold;
based on detecting that the number of retransmission exceeds the retransmissions threshold, select a fifth transmission pattern from the plurality of transmission pattern, the fifth transmission pattern comprising a fifth packet split ratio, fifth detailed sequential information, and fifth criterions for the UE to select and use the fifth transmission pattern; and
transmit a fifth set of packets using the fifth transmission pattern, wherein the fifth packet split ratio is different than the first packet split ratio, the second packet split ratio, the third packet split ratio, and the fourth packet split ratio; and
during a sixth period time:
based a current measurement of the CBR, the PRR, the packet E2E, and the number of retransmissions, select a sixth transmission pattern from the plurality of transmission patterns, the sixth transmission pattern comprising a sixth packet split ratio, sixth detailed sequential information, and sixth criterions for the UE to select and use the sixth transmission pattern; and transmit a sixth set of packets using the sixth transmission pattern, wherein the sixth packet split ratio is different than the first packet split ratio, the second packet split ratio, the third packet split ratio, the fourth packet split ratio, and the fifth packet split ratio;

update a transmission pattern from among the configured plurality of transmission patterns based on local sensing conditions;

calculate a buffer status report (BSR) using the updated transmission pattern; and transmit the BSR to a network node, wherein a packet split ratio is a ratio of data transmissions via the SL mode 1 to data transmissions via the SL mode 2.

11. The apparatus according to claim 10, wherein the computer program code when executed by the at least one processor, cause the apparatus to at least one of:

receive a configuration of conditions for triggering the SL LCH to start its dual-mode transmission by using the configured plurality of transmission patterns; or receive a configuration of the conditions for triggering the SL LCH to switch from a dual-mode operation back to a single-mode operation.

12. The apparatus according to claim 11, wherein the computer program code when executed by the at least one processor, cause the apparatus at least to:

transmit, to the network node, an indication of the selected or the updated transmission pattern for the dual mode SL LCH.

13. The apparatus according to claim 12, wherein, when transmitting the indication, the computer program code when executed by the at least one processor, cause the apparatus at least to transmit an indication of a reason for using the selected or updated transmission pattern.

14. The apparatus according to claim 10, wherein the apparatus is an SL UE, and wherein the computer program code when executed the at least one processor, cause the apparatus at least to:

transmit, to one or more peer SL UE, an indication of the selected or updated transmission pattern for the dual mode SL LCH.

15. The apparatus according to claim 10, wherein the computer program code when executed by the at least one processor, cause the apparatus at least to:

receive a resource allocation from the network node.

16. The apparatus according to claim 10, wherein the computer program when executed by the at least one processor, cause the apparatus at least to:

receive a reconfiguration of the dual mode SL LCH or the plurality of transmission patterns from the network node.

17. The apparatus according to claim 10, wherein the computer program code when executed by the at least one processor, cause the apparatus at least to:

based on a SL mode 1 resource allocated by the network node and the selected SL mode-2 resource, transmit packets from the dual-mode SL LCH via the different modes according to a selected transmission pattern.

18. The apparatus according to claim 10, wherein the computer program code when executed by the at least one processor, cause the apparatus at least to:

perform radio link monitoring (RLM); and use results of the radio link monitoring (RLM) to a select most appropriate transmission pattern from the plurality of transmission patterns.

19. A non-transitory computer-readable medium storing instructions, said instructions which, when executed by a processor, cause a sidelink (SL) user equipment (UE) to perform a method comprising:

receiving a configuration to simultaneously use sidelink (SL) SL mode 1 and SL mode 2 for an SL logical channel (LCH);

receiving a configuration for a plurality of transmission patterns for simultaneously using the SL mode 1 and the SL mode 2;

during a first period time:

detecting an ultra-high traffic load in the SL mode 1;

based on detecting the ultra-high traffic load in the SL mode 1, select a first transmission pattern from the plurality of transmission patterns, the first transmission pattern comprising a first packet split ratio, first detailed sequential information, and first criterions for the UE to select and use the first transmission pattern; and transmitting a first set of packets using the first transmission pattern by transmitting less data via the SL mode 1 based on the first packet split ratio;

during a second period time:

detecting a channel busy ratio (CBR) that exceeds a CBR threshold;

based on detecting the CBR that exceeds the CBR threshold, select a second transmission pattern from the plurality of transmission patterns, the second transmission comprising a second packet split ratio, second detailed sequential information, and second criterions for the UE to select and use the second transmission pattern; and transmitting a second set of packets using the second transmission pattern, wherein the second packet split ratio is different than the first packet split ratio;

during a third period time:

detecting a packet reception ratio (PRR) that is below a PRR threshold;

based on detecting the PRR that is below the PRR threshold, select a third transmission pattern from the plurality of transmission patterns, the third transmission pattern comprising a third packet split ratio, third detailed sequential information, and third criterions for the UE to select and use the third transmission pattern; and transmitting a third set of packets using the third transmission pattern, wherein the third packet split ratio is different than the first packet split ratio and the second packet split ratio;

during a fourth period time:

detecting a packet end-to-end latency (E2E) that exceeds an E2E threshold;

based on detecting the packet E2E that exceeds the E2E threshold, select a fourth transmission pattern from the plurality of transmission patterns, the fourth transmission pattern comprising a fourth packet split ratio, fourth detailed sequential information, and fourth criterions for the UE to select and use the fourth transmission pattern; and transmitting a fourth set of packets using the fourth transmission pattern, wherein the fourth packet split ratio is different than the first packet split ratio, the second packet split ratio, and the third packet split ratio;

during a fifth period time:
   detecting that a number of retransmission exceeds a retransmission threshold;
   based on detecting that the number of retransmission exceeds the retransmissions threshold, select a fifth transmission pattern from the plurality of transmission pattern, the fifth transmission pattern comprising a fifth packet split ratio, fifth detailed sequential information, and fifth criterions for the UE to select and use the fifth transmission pattern; and
   transmitting a fifth set of packets using the fifth transmission pattern, wherein the fifth packet split ratio is different than the first packet split ratio, the second packet split ratio, the third packet split ratio, and the fourth packet split ratio;
during a sixth period time:
   based a current measurement of the CBR, the PRR, the packet E2E, and the number of retransmissions, select a sixth transmission pattern from the plurality of transmission patterns, the sixth transmission pattern comprising a sixth packet split ratio, sixth detailed sequential information, and sixth criterions for the UE to select and use the sixth transmission pattern; and
   transmitting a sixth set of packets using the sixth transmission pattern, wherein the sixth packet split ratio is different than the first packet split ratio, the second packet split ratio, the third packet split ratio, the fourth packet split ratio, and the fifth packet split ratio;
updating a transmission pattern from among the configured plurality of transmission patterns based on local sensing conditions;
calculating a buffer status report (BSR) using the updated transmission pattern; and
transmitting the BSR to a network node,
wherein a packet split ratio is a ratio of data transmissions via the SL mode 1 to data transmissions via the SL mode 2.

* * * * *